United States Patent
Myszkowski et al.

(10) Patent No.: US 11,433,821 B2
(45) Date of Patent: Sep. 6, 2022

(54) CARGO AREA SIDE PANEL ASSEMBLY FOR A VEHICLE

(71) Applicant: Honda Motor Co., Ltd., Tokyo (JP)

(72) Inventors: Marek Myszkowski, Powell, OH (US); Sarah J. Huth, Dublin, OH (US); Shirena Takai, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 217 days.

(21) Appl. No.: 16/828,560

(22) Filed: Mar. 24, 2020

(65) Prior Publication Data
US 2021/0300230 A1   Sep. 30, 2021

(51) Int. Cl.
| | |
|---|---|
| *B60R 5/04* | (2006.01) |
| *B62D 25/02* | (2006.01) |
| *B60P 7/02* | (2006.01) |
| *B60J 7/16* | (2006.01) |
| *B60P 7/08* | (2006.01) |

(52) U.S. Cl.
CPC ............ *B60R 5/047* (2013.01); *B60J 7/1607* (2013.01); *B60P 7/02* (2013.01); *B60P 7/08* (2013.01); *B62D 25/02* (2013.01)

(58) Field of Classification Search
CPC . B60J 7/085; B60J 7/1607; B60P 7/02; B60R 5/044; B60R 5/047; B62D 25/02; B62D 33/046

USPC .................. 296/100.01, 100.11, 100.12
See application file for complete search history.

(56) References Cited

U.S. PATENT DOCUMENTS

| | | | |
|---|---|---|---|
| 4,932,704 A * | 6/1990 | Ament .................. | B60R 5/048 160/84.04 |
| 6,491,332 B2 | 12/2002 | De Ceuster | |
| 7,857,372 B2 | 12/2010 | Fukushima et al. | |
| 8,480,154 B2 | 7/2013 | Yue | |
| 9,381,794 B2 | 7/2016 | Gomes et al. | |
| 10,315,582 B2 | 6/2019 | Southey et al. | |
| 2007/0182190 A1 | 8/2007 | Walter et al. | |
| 2008/0179022 A1 * | 7/2008 | Hayashi .................. | B60R 5/047 160/327 |

FOREIGN PATENT DOCUMENTS

| | | | | |
|---|---|---|---|---|
| EP | 1826064 A1 * | 8/2007 | ............ | B60R 5/047 |
| FR | 3035628 A1 * | 11/2016 | ........... | B62D 25/087 |
| KR | 100793482 B1 | 1/2008 | | |
| WO | WO-2018167979 A1 * | 9/2018 | ............... | B60Q 3/30 |

* cited by examiner

*Primary Examiner* — Jason S Daniels
(74) *Attorney, Agent, or Firm* — Armstrong Teasdale LLP

(57) ABSTRACT

A vehicle includes a cargo area side panel assembly including a first panel and a second panel coupled to the first panel such that the first panel and the second panel cooperate to define a channel. The channel is defined by an upper wall, a lower wall, and a sidewall extending therebetween. The vehicle also includes a cargo cover assembly moveable between a retracted position and an extended position, wherein the cargo cover assembly comprises an engagement mechanism configured to engage said channel.

20 Claims, 6 Drawing Sheets

CARGO AREA SIDE PANEL ASSEMBLY FOR A VEHICLE

BACKGROUND

The present disclosure relates generally to a cargo area side panel assembly for a vehicle, and, more specifically, to a cargo area side panel assembly including multiple panels that form a channel.

At least some known vehicles include a cargo area located in a rear portion of the vehicle behind a row of seating. Furthermore, at least some vehicles include cargo cover assemblies, also known as tonneau cover assemblies. Tonneau cover assemblies usually serve as a means to conceal the contents of the cargo area, or rear compartment, of a hatchback, sport utility vehicle, station wagon, pickup truck or any other type of vehicle which may have luggage, equipment or other personal items contained therein.

At least some known tonneau cover assemblies include a housing configured to store the tonneau cover in a retracted position. When removed from a housing, at least some known tonneau covers hook into a recess formed on a side panel of the cargo area. In at least some vehicles, the recess is generally aligned with the housing to reduce stress induced to the tonneau cover assembly. Moreover, in some known vehicles, the recess is formed within a single panel. However, in other vehicles, the optimal position for the recess is defined at a seam formed between adjacent side panels. In such a configuration, it may be difficult for a user to consistently and easily align the tonneau cover with a single landing surface to facilitate engagement.

BRIEF SUMMARY

In one aspect, a cargo area side panel assembly for a vehicle is provided. The cargo area side panel assembly includes a first panel and a second panel coupled to the first panel such that the first panel and the second panel cooperate to define a channel, wherein the channel is defined by at least three walls.

In another aspect, a vehicle is provided. The vehicle includes a cargo area side panel assembly including a first panel and a second panel coupled to the first panel such that the first panel and the second panel cooperate to define a channel. The channel is defined by an upper wall, a lower wall, and a sidewall extending therebetween. The vehicle also includes a cargo cover assembly moveable between a retracted position and an extended position, wherein the cargo cover assembly comprises an engagement mechanism configured to engage said channel.

DETAILED DESCRIPTION

The present disclosure relates generally to a cargo area side panel assembly for a vehicle, and, more specifically, to a cargo area side panel assembly that includes multiple panels that form a channel.

The systems described herein relate generally to a cargo area side panel assembly for a vehicle. The cargo area side panel assembly includes a first panel and a second panel coupled together such that the first panel and the second panel cooperate to define a channel in the panels, wherein the channel is defined by at least three walls. More specifically, the channel is defined by an upper wall, a lower wall, and a sidewall extending therebetween. The vehicle also includes a cargo cover assembly that includes an engagement mechanism that engages the channel, wherein the cover assembly is selectively moveable between a retracted position and an extended position.

As such, the systems described herein enable a user to quickly and easily position or reposition the engagement mechanism within the channel such that the cover portion may be moved between the retracted and extended positions. Horizontal alignment of the channel with the cargo cover assembly housing facilitates reducing the stress induced to mechanical components within the housing. Furthermore, defining the channel with at least three walls facilitates the engagement mechanism being captured and retained within the channel even if the cover portion is not pulled precisely in a horizontal direction by a user.

Figure 1:
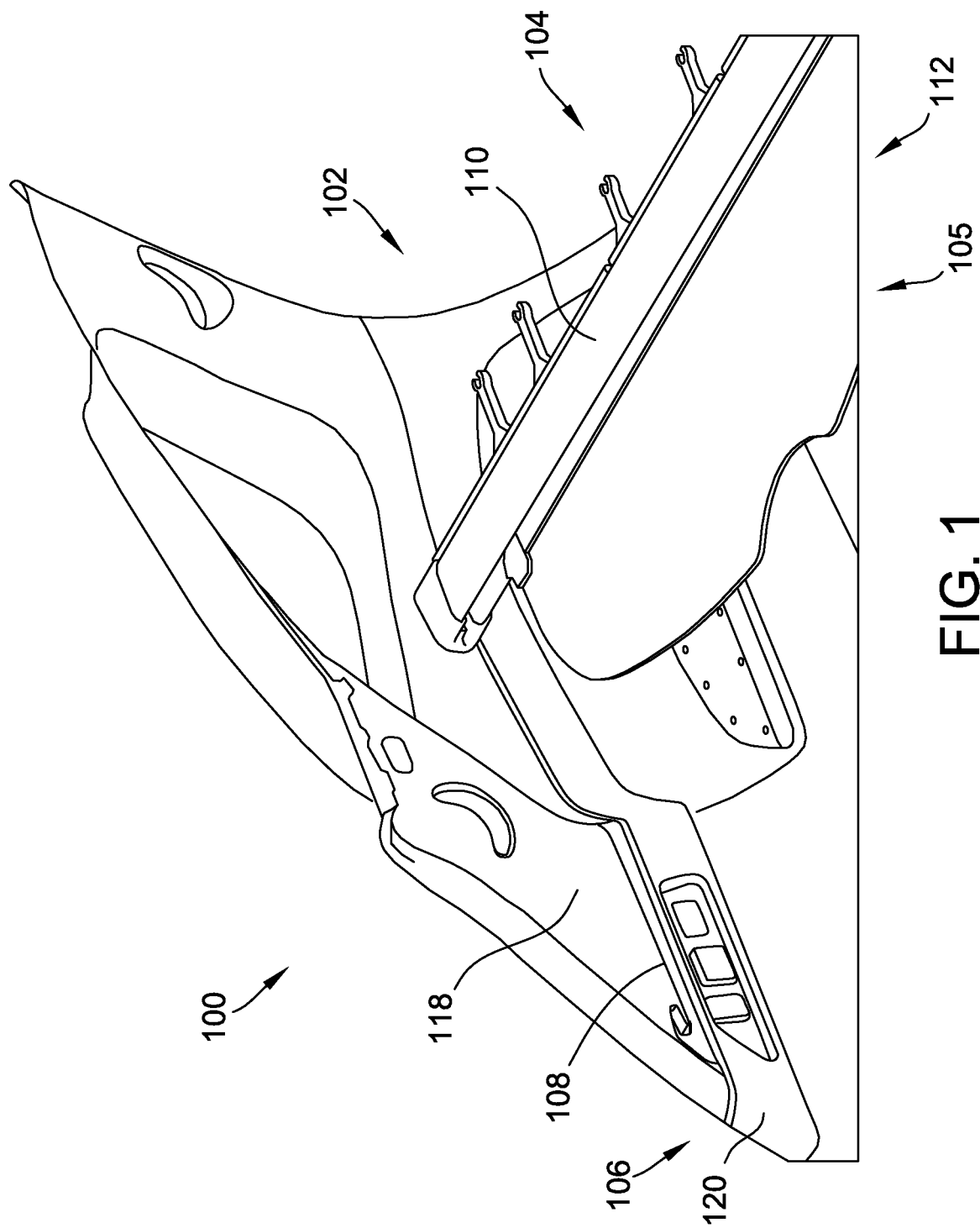
FIG. 1 is a perspective view of an exemplary vehicle cargo area including a cargo cover assembly and a cargo area side panel assembly.
Figure 2:
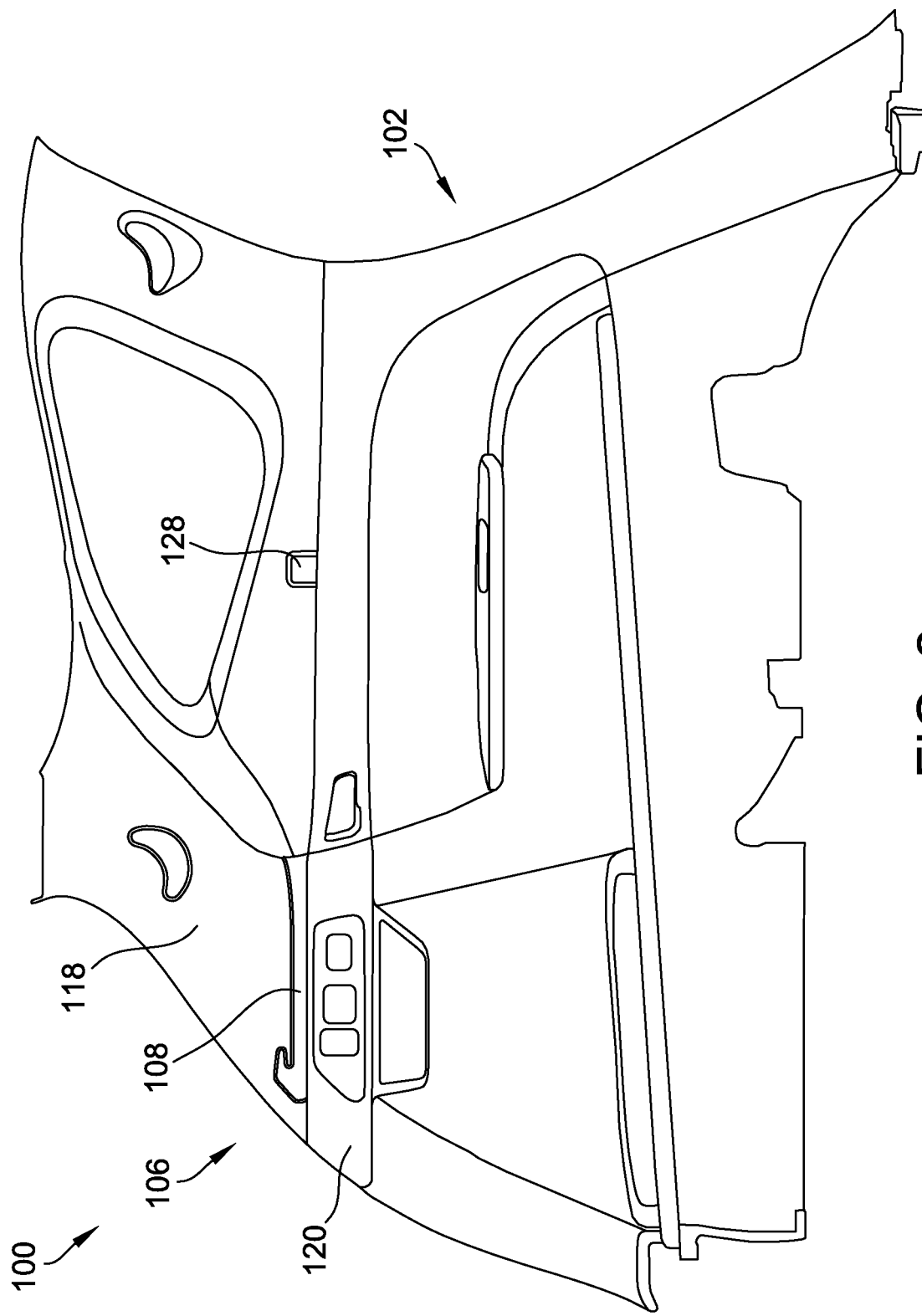
FIG. 2 is a side view of the cargo area side panel assembly shown in FIG. 1.
Figure 3:
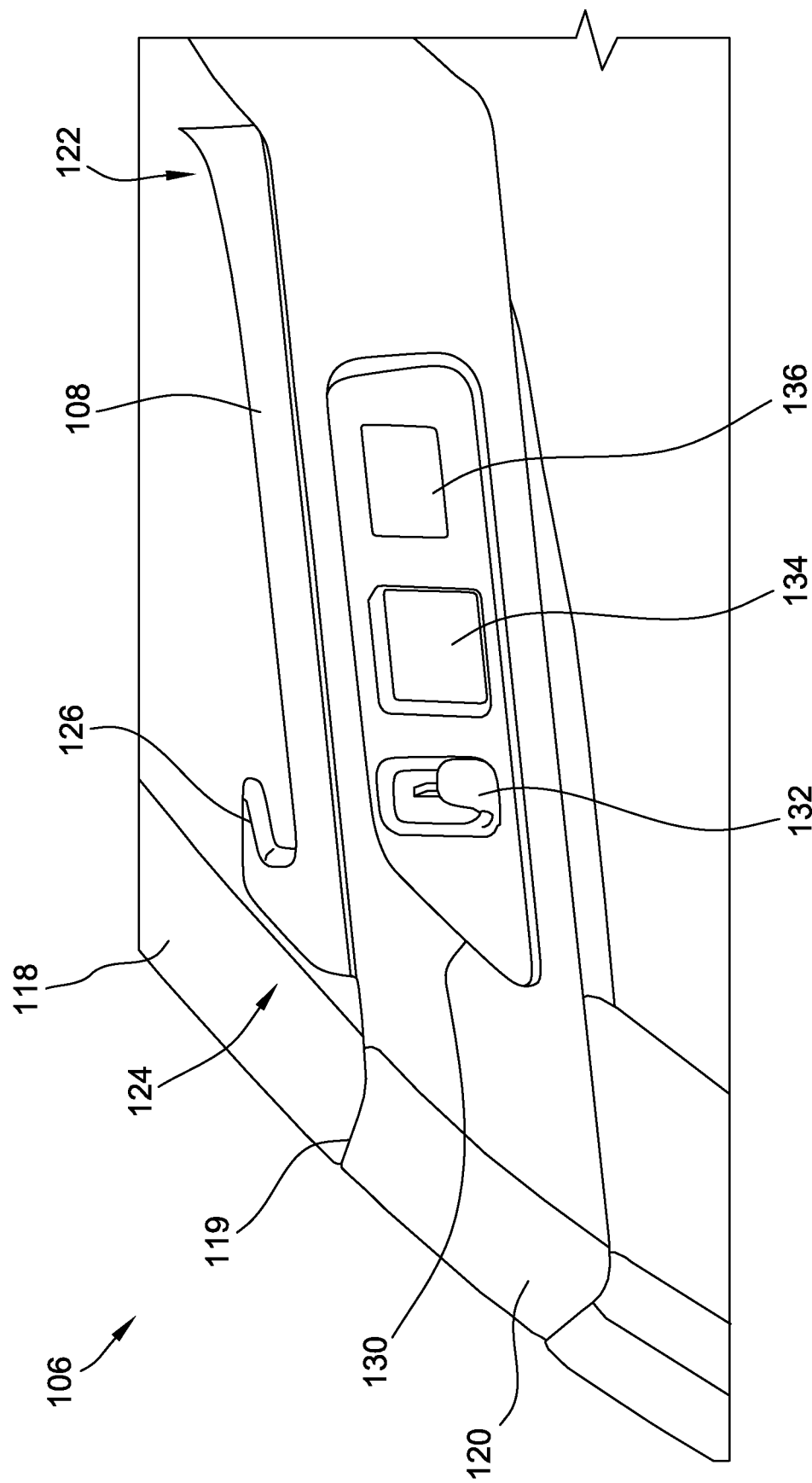
FIG. 3 is a side perspective view of the cargo area side panel assembly shown in FIG. 1 and illustrating an exemplary side panel assembly channel.
Figure 4:
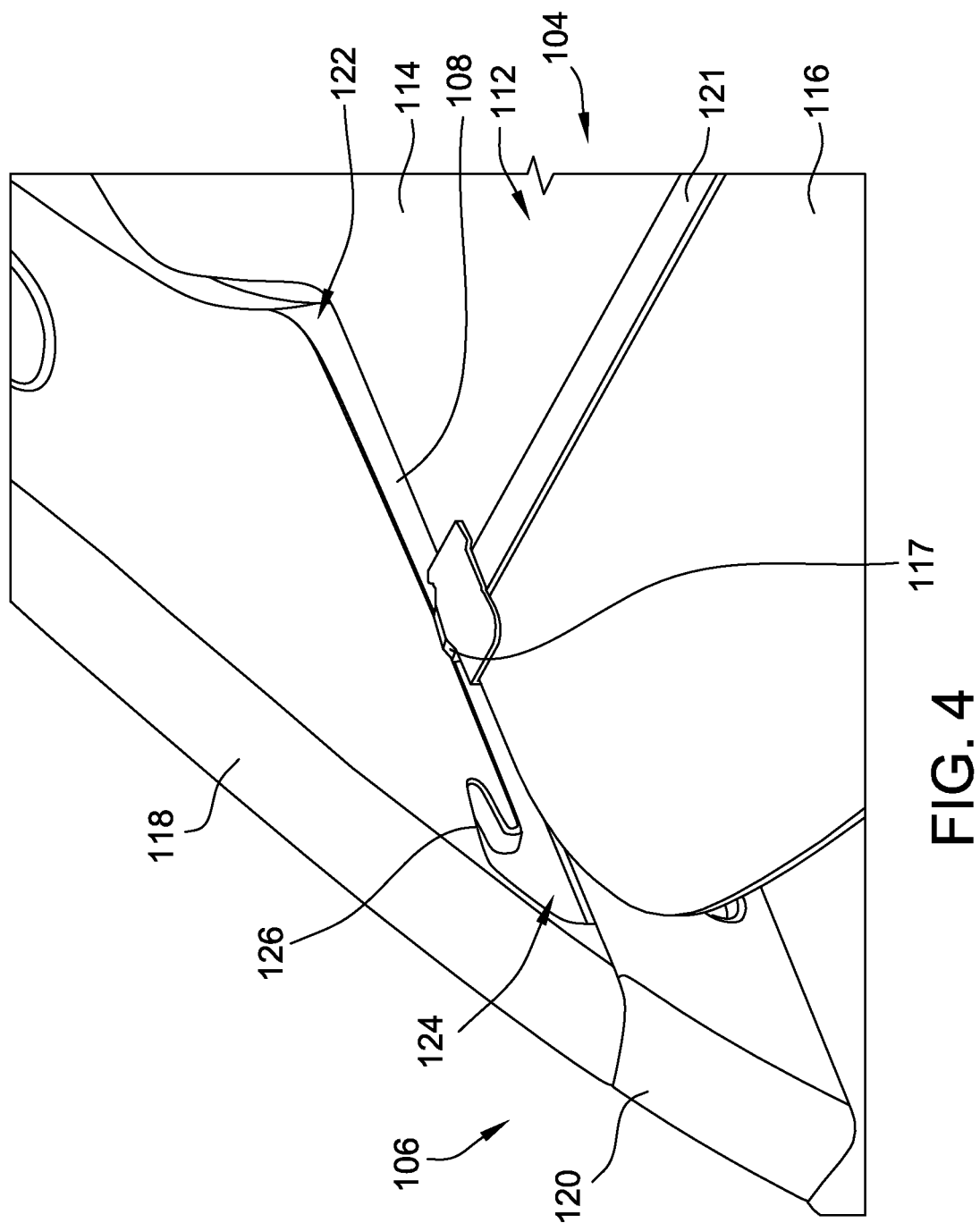
FIG. 4 is a top perspective view of the cargo cover assembly shown in FIG. 1 and in an intermediate position and engaged with the side panel assembly channel.

FIG. 1 is a perspective view of an exemplary vehicle 100 including a defined cargo area 102 including a cargo cover assembly 104 and a cargo area side panel assembly 106. FIG. 2 is a side view of cargo area side panel assembly 106, and FIG. 3 is a side perspective view of cargo area side panel assembly 106 including an exemplary side panel assembly channel 108. FIG. 4 is a top perspective view of cargo cover assembly 104 in an intermediate position and engaged with side panel assembly channel 108. In the exemplary embodiment, cargo cover assembly 104 includes a housing 110 coupled to cargo area side panel assembly 106 such that housing 110 is at the front of the cargo area 102 and is immediately behind the back of the rear seat of vehicle 100. Cargo cover assembly 104 is selectively moveable between a retracted position 105 (shown in FIG. 1) and an extended position 107 (shown in FIG. 6). In the retracted position 105, cargo area 102 is visible and accessible from the back of vehicle 100, and, in contrast, in the extended position 107, cargo cover assembly 104 conceals cargo area 102 from view.

In the exemplary embodiment, cargo cover assembly 104 also includes a cover portion 112 that is at least partially retractable within housing 110. Specifically, in the exemplary embodiment, cover portion 112 includes a generally flexible cover section 114 and a generally rigid flap section 116 that extends from a distal end 115 of cover section 114. In one embodiment, an opposite end of cover section 114 is secured to a spring-biased spool (not shown) within housing 110 which biases cover portion 112 towards the retracted position 105. As shown in FIG. 1, flap section 116 extends from housing 110 when cover portion 112 is in the retracted position 105 and is shaped to substantially conform to a shape of a rear wall (not shown) of cargo area 102. In the exemplary embodiment, cargo cover assembly 104 also includes an engagement mechanism 117 coupled to cover portion 112. Engagement mechanism 117, in the exemplary embodiment, is coupled to cover portion 112 along a seam 121 defined between cover section 114 and flap section 116. As described in further detail below, engagement mechanism 117 selectively engages a portion of channel 108 to facilitate securing cargo cover assembly 104 in the extended position 107. When removed from channel 108, the spool within housing 110 urges cover portion 112 into the retracted position 105.

In the exemplary embodiment, cargo area side panel assembly 106 includes a first panel 118 and a second panel 120 coupled to first panel 118 such that first panel 118 and second panel 120 cooperate to define channel 108. As best shown in FIG. 3, channel 108 includes a first end 122 and a second end 124. In the exemplary embodiment, first end 122 tapers outwardly to facilitate receiving engagement mechanism 117 therein. Furthermore, second end 124 of channel 108 includes a retention feature 126 that engages engagement mechanism 117 to facilitate retaining cargo cover assembly 104 in the extended position 107.

Figure 6:
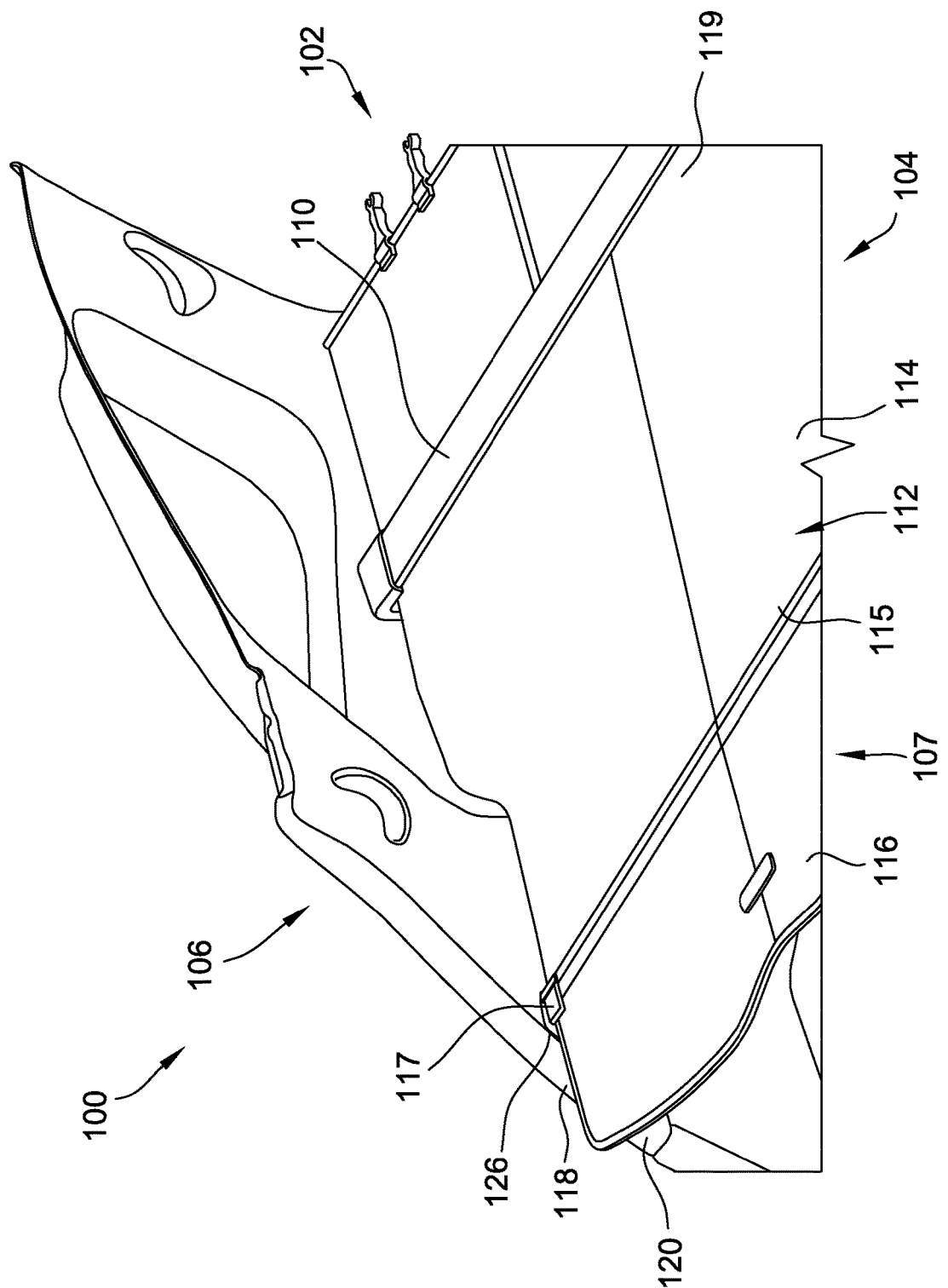
FIG. 6 is a top perspective view of the vehicle cargo area shown in FIG. 1 with the cargo cover assembly in an extended position and engaged with the side panel assembly channel.

In the exemplary embodiment, housing 110 of cargo cover assembly 104 is coupled to first panel 118. Retention feature 126 is formed in first panel 118. Specifically, first panel 118 includes a recess 128 sized and oriented to receive a portion of housing 110 therein for coupling cargo cover assembly 104 to cargo area side panel assembly 106 within vehicle cargo area 102. As shown in FIG. 2, recess 128 and channel 108, and, specifically, retention feature 126, are substantially aligned with respect to each other. As such, housing 110 and channel 108 are also substantially aligned such that cover portion 112 is substantially horizontal when in the extended position 107, as shown in FIG. 6. Such a configuration reduces the stress on the mechanical components of cargo cover assembly 104.

Referring to FIG. 3, second panel 120 includes a recess 130 formed therein that is spaced below channel 108. Recess 130 is formed in second panel 120 to enable the attachment of one or more features to second panel 120 without those features extending into the cargo volume of vehicle 100. For example, vehicle 100 includes a hook 132, a power outlet 134, and an air vent 136 coupled to second panel 120 within recess 130. In other embodiments, vehicle 100 may include any combination of hook 132, power outlet 134, and air vent 136. Generally, vehicle 100 includes any number of features coupled to second panel 120 within recess 130 and is not limited to the number or type described herein.

The orientation of side panel assembly first panel 118 and second panel 120 enables the inclusion of features, such as hook 132, power outlet 134, and air vent 136. More specifically, a seam 119 formed between first panel 118 and second panel 120 extends through channel 108 and is substantially horizontally aligned with housing 110, such that walls 138, 140, and 142 of channel 108 are formed by the cooperation of first panel 118 and second panel 120.

Figure 5:
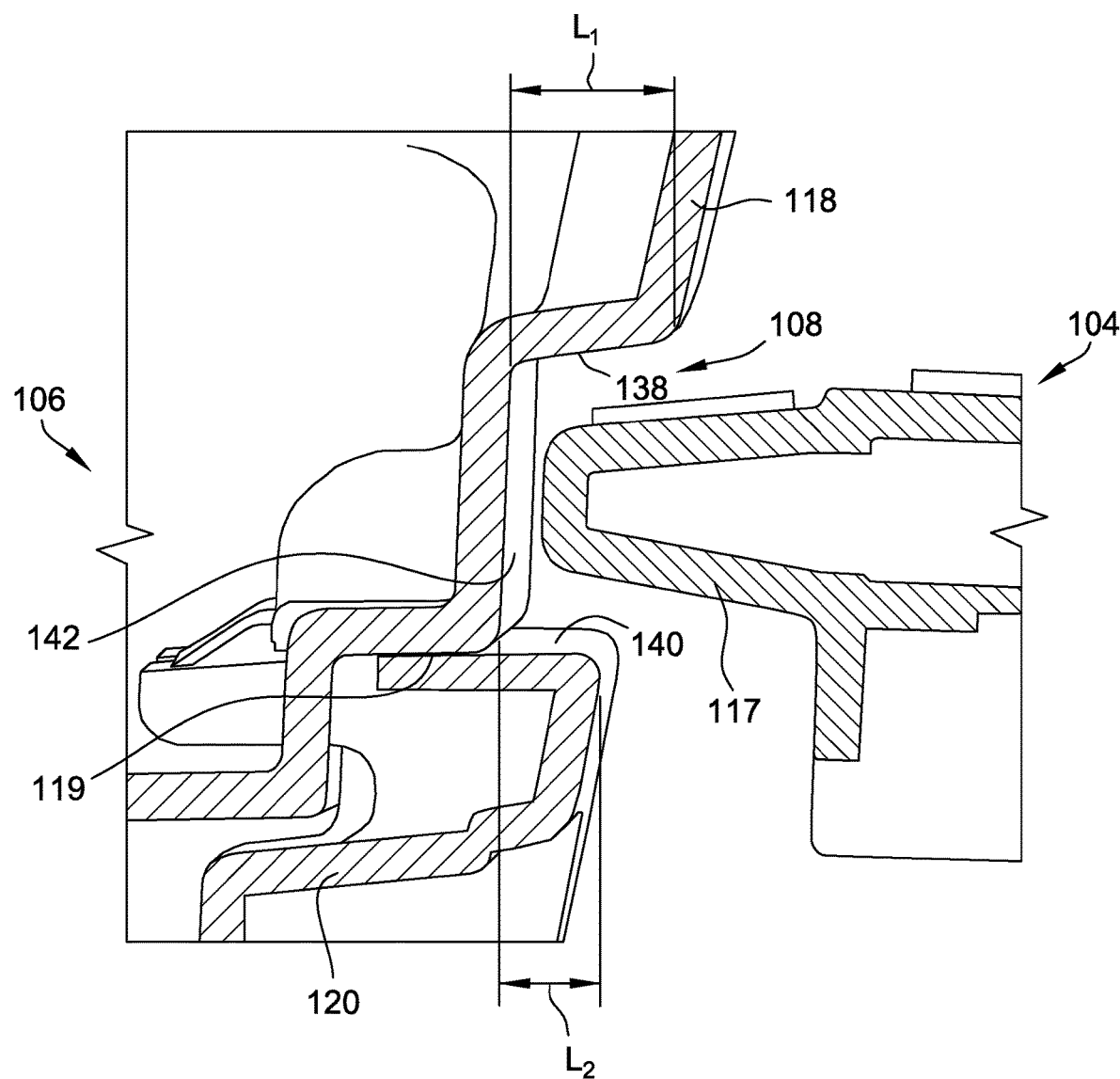
FIG. 5 is a cross-sectional view of the cargo area side panel assembly shown in FIG. 1 and illustrating the side panel assembly channel and a portion of the cargo cover assembly.

FIG. 5 is a cross-sectional view of cargo area side panel assembly 106 illustrating channel 108 and engaging mechanism 117 with cargo cover assembly 104 in an intermediate position between the retracted position 105 and the extended position 107. In the exemplary embodiment, channel 108 is defined by at least three walls 138, 140, and 142. Specifically, in the exemplary embodiment, channel 108 is defined by an upper wall 138, a lower wall 140, and a sidewall 142 extending therebetween. Defining channel 108 by at least three walls 138, 140, and 142 facilitates easier capture and retention of engagement mechanism 117 within channel 108. For example, if channel 108 were merely formed by sidewall 142 and upper wall 138 only, then unintentionally pulling cover portion 112 toward the floor (not shown) of cargo area 102 may undesirably remove engagement mechanism 117 from channel 108. Similarly, if channel 108 were merely formed by sidewall 142 and lower wall 140 only, then unintentionally pulling cover portion 112 toward the ceiling (not shown) of cargo area 102 may undesirably remove engagement mechanism 117 from channel 108. As such, the three walls 138, 140, and 142 of channel 108 facilitate capturing and retaining engagement mechanism 117 within channel 108 even if cover portion 112 is not pulled in a horizontal direction.

In the exemplary embodiment, first panel 118 includes upper wall 138 and sidewall 142, and second panel 120 includes lower wall 140. In another embodiment, first panel 118 includes upper wall 138, while second panel 120 includes sidewall 142 and lower wall 140. As shown in FIG. 5, and as viewed along channel 108, upper wall 138 is obliquely oriented with respect to lower wall 140 and also obliquely oriented with respect to sidewall 142. Furthermore, lower wall 140 may be substantially perpendicular to sidewall 142. In other embodiments, walls 138, 140, and 142 have any other relative orientation. For example, in one embodiment, upper wall 138 may be substantially parallel to lower wall 140 and substantially perpendicular to sidewall 142. Additionally, the relative orientation of walls 138, 140, and 142 may change along the length of channel 108 between first end 122 and second end 124. For example, upper wall 138 may be obliquely oriented with respect to sidewall 142 near first end 122 to facilitate easier insertion of engagement mechanism 117 into channel 108.

As shown in FIG. 5, in the exemplary embodiment, upper wall 138 extends a first length $L_1$ away from sidewall 142, and lower wall 140 extends a second length $L_2$ from sidewall 142 that is shorter than first length $L_1$. In the exemplary embodiment, first length $L_1$ is longer than second length $L_2$ to facilitate retaining engagement mechanism 117 within channel 108. Because retention feature 126 extends from upper wall 138, the user may have a tendency to pull cover portion 112 slightly upward to engage retention feature 126. Providing upper wall 138 with a longer length $L_1$ reduces a likelihood that the user will undesirably remove engagement mechanism 117 from channel 108. In other embodiments, walls 138 and 140 have any other relative length. For example, in one embodiment, upper wall 138 and lower wall 140 extend substantially the same length from sidewall 142. Additionally, the relative lengths of walls 138 and 140 may change along the length of channel 108 between first end 122 and second end 124.

The systems described herein provide a cargo area side panel assembly for a vehicle. The cargo area side panel assembly includes a first and a second panel coupled together such that the first panel and the second panel cooperate to define a channel defined by at least three walls. More specifically, the channel is defined by an upper wall, a lower wall, and a sidewall extending therebetween. The vehicle also includes a cargo cover assembly moveable between a retracted position and an extended position, wherein the cargo cover assembly comprises an engagement mechanism configured to engage the channel.

As such, the systems and methods described herein enable a user to quickly and easily position or reposition the engagement mechanism within the channel and selectively move the cover portion between the retracted position and the extended position. Horizontal alignment of the channel with the cargo cover assembly housing reduces the stress induced to mechanical components within the housing. Furthermore, defining the channel by at least three walls facilitates capturing and retaining the engagement mechanism within the channel even if the cover portion is not pulled in a generally horizontal direction. As described herein, orientation of the first panel and the second panel enables additional features to be formed in and coupled to the second panel without obstructing operation of the cargo cover assembly. As such, the region defined between the first panel and the second panel is positioned at the ideal location of the channel that enables the walls of the channel to be formed by a combination of the first panel and the second panel.

Exemplary embodiments of cargo area side panel assemblies are described herein. The systems and methods are not limited to the specific embodiments described herein, but rather, components of the systems and/or steps of the methods may be utilized independently and separately from other components and/or steps described herein.

This written description uses examples to disclose the embodiment, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cargo area side panel assembly for a vehicle, said cargo area side panel assembly comprising:
    a housing;
    a biasing mechanism within the housing;
    a cover coupled to said biasing mechanism, said cover selectively moveable between a retracted position and an extended position;
    a first panel comprising an upper wall and a sidewall; and
    a second panel coupled against a lower surface of said first panel, said second panel comprising a lower wall positioned such that a channel is formed by a portion of said first and second panels, wherein said cover engages a portion of said channel when in the extended position, and
    wherein said biasing mechanism biases said cover into the retracted position only when said cargo cover is removed from said channel.

2. The cargo area side panel assembly of claim 1, wherein said sidewall extends between said upper and lower walls.

3. The cargo area side panel assembly of claim 1, wherein said upper wall is obliquely oriented with respect to said lower wall.

4. The cargo area side panel assembly of claim 1, wherein said upper wall is obliquely oriented with respect to said sidewall.

5. The cargo area side panel assembly of claim 1, wherein said sidewall is substantially perpendicular to said lower wall.

6. The cargo area side panel assembly of claim 1, wherein said upper wall extends a first length away from said sidewall, and wherein said lower wall extends a second length from said sidewall that is shorter than the first length.

7. The cargo area side panel assembly of claim 1, wherein said channel comprises a first end and a second end, wherein said first end is outwardly tapered, and wherein said second end comprises a retention feature.

8. The cargo area side panel assembly of claim 7, wherein said first panel comprises said retention feature.

9. A vehicle comprising:
    a cargo area side panel assembly comprising a first panel and a second panel coupled against a lower surface of said first panel such that said first panel and said second panel cooperate to form a channel, wherein said channel is defined by an upper wall, a lower wall, and a sidewall extending therebetween; and
    a cargo cover assembly moveable between a retracted position and an extended position, wherein said cargo cover assembly comprises an engagement mechanism configured to engage said channel;
    wherein said channel retains the engagement mechanism when said cargo cover assembly is in the extended position, and
    wherein said cargo cover assembly is biased into the retracted position only when removed from said channel.

10. The cargo area side panel assembly of claim 9, wherein said first panel comprises said upper wall and said sidewall, and wherein said second panel comprises said lower wall.

11. The cargo area side panel assembly of claim 10, wherein said upper wall is obliquely oriented with respect to said lower wall.

12. The cargo area side panel assembly of claim 10, wherein said upper wall is obliquely oriented with respect to said sidewall.

13. The cargo area side panel assembly of claim 10, wherein said sidewall is substantially perpendicular to said lower wall.

14. The cargo area side panel assembly of claim 10, wherein said upper wall extends a first length from said sidewall, and wherein said lower wall extends a second length from said sidewall that is shorter than the first length.

15. The cargo area side panel assembly of claim 10, wherein said upper wall is obliquely oriented with respect to said lower wall, wherein said upper wall is obliquely oriented with respect to said sidewall, and wherein said sidewall is substantially perpendicular to said lower wall.

16. The cargo area side panel assembly of claim 9, wherein said channel comprises a first end and a second end, wherein said first end is divergent, and wherein said second end comprises a retention feature.

17. The cargo area side panel assembly of claim 16, wherein said first panel comprises said retention feature.

18. The cargo area side panel assembly of claim 9, wherein said second panel comprises at least one recess.

19. The cargo area side panel assembly of claim 9, wherein said cargo cover assembly comprises a housing coupled to said first panel, and wherein said channel is substantially aligned with said housing.

20. The cargo area side panel assembly of claim 1, wherein said cover conceals at least a portion of a cargo area when in the extended position.

* * * * *